(12) United States Patent
Smith et al.

(10) Patent No.: US 9,491,638 B2
(45) Date of Patent: Nov. 8, 2016

(54) WIRELESS ACCESS POINT ARRAY

(71) Applicant: XIRRUS, INC., Thousand Oaks, CA (US)

(72) Inventors: Steve Smith, Ventura, CA (US); Dirk Ion Gates, Westlake Village, CA (US); Ian Laity, San Diego, CA (US); Michael R. Conley, Thousand Oaks, CA (US); Michael De La Garrigue, Agoura Hills, CA (US); Kurt Sauter, Thousand Oaks, CA (US)

(73) Assignee: Xirrus, Inc., Thousand Oaks, CA (US)

( * ) Notice: Subject to any disclaimer, the term of this patent is extended or adjusted under 35 U.S.C. 154(b) by 0 days.

(21) Appl. No.: 14/195,490

(22) Filed: Mar. 3, 2014

(65) Prior Publication Data

US 2014/0226462 A1    Aug. 14, 2014

Related U.S. Application Data

(63) Continuation of application No. 13/732,201, filed on Dec. 31, 2012, now Pat. No. 8,665,851, which is a continuation of application No. 13/297,006, filed on Nov. 15, 2011, which is a continuation of application (Continued)

(30) Foreign Application Priority Data

| Mar. 9, 2006 | (WO) | PCT/US2006/008696 |
| Mar. 9, 2006 | (WO) | PCT/US2006/008698 |
| Mar. 9, 2006 | (WO) | PCT/US2006/008744 |
| Mar. 9, 2006 | (WO) | PCT/US2006/008747 |

(51) Int. Cl.
*H04W 16/20* (2009.01)
*H04W 16/28* (2009.01)

(Continued)

(52) U.S. Cl.
CPC ............. *H04W 16/28* (2013.01); *H01Q 1/007* (2013.01); *H01Q 9/285* (2013.01); *H01Q 19/106* (2013.01); *H01Q 21/205* (2013.01); *H04W 72/0453* (2013.01); *H04W 72/082* (2013.01); *H04W 84/12* (2013.01)

(58) Field of Classification Search
CPC ...... H01Q 1/007; H01Q 21/20; H01Q 19/10; H01Q 1/2258; H01Q 17/00; H01Q 1/523; H01Q 25/00; H01Q 21/28; H01Q 1/521; H01Q 3/02; H01Q 3/24; H01Q 1/084; H01Q 1/12; H01Q 25/002

See application file for complete search history.

(56) References Cited

U.S. PATENT DOCUMENTS 7,512,083 B2 *  3/2009  Li .................................. 370/269
7,636,554 B2 * 12/2009  Sugar et al. .................... 455/73

(Continued)

*Primary Examiner* — Jung-Jen Liu
(74) *Attorney, Agent, or Firm* — SoCal IP Law Group LLP; Steven C. Sereboff; John E. Gunther

(57) ABSTRACT

A system of at least one wireless access device in a local area network (LAN) having a plurality of transceivers. Each transceiver has a directional antenna positioned in a substantially circular array to communicate signals with a plurality of stations in a corresponding sector. Each sector defines a portion of a coverage area surrounding the wireless access device. The wireless access device has a network interface to a data network, and an array controller to control communication of data between the stations and the transceivers, and between the transceivers and the network interface. The array controller is configured to modify channel assignments so as to minimize channel interference dynamically.

21 Claims, 10 Drawing Sheets

Related U.S. Application Data

No. 11/816,003, filed as application No. PCT/US2006/008743 on Mar. 9, 2006, now Pat. No. 8,160,036, application No. 14/195,490, which is a continuation of application No. 13/732,172, filed on Dec. 31, 2012, now Pat. No. 8,665,850.

(60) Provisional application No. 60/660,171, filed on Mar. 9, 2005, provisional application No. 60/660,276, filed on Mar. 9, 2005, provisional application No. 60/660,375, filed on Mar. 9, 2005, provisional application No. 60/660,275, filed on Mar. 9, 2005, provisional application No. 60/660,210, filed on Mar. 9, 2005, provisional application No. 60/660,174, filed on Mar. 9, 2005, provisional application No. 60/660,394, filed on Mar. 9, 2005, provisional application No. 60/660,209, filed on Mar. 9, 2005, provisional application No. 60/660,393, filed on Mar. 9, 2005, provisional application No. 60/660,269, filed on Mar. 9, 2005, provisional application No. 60/660,392, filed on Mar. 9, 2005, provisional application No. 60/660,391, filed on Mar. 9, 2005, provisional application No. 60/660,277, filed on Mar. 9, 2005, provisional application No. 60/660,302, filed on Mar. 9, 2005, provisional application No. 60/660,376, filed on Mar. 9, 2005, provisional application No. 60/660,541, filed on Mar. 9, 2005, provisional application No. 61/933,783, filed on Jan. 30, 2014.

(51) Int. Cl.
| | | |
|---|---|---|
| *H01Q 1/00* | (2006.01) | |
| *H01Q 9/28* | (2006.01) | |
| *H01Q 19/10* | (2006.01) | |
| *H01Q 21/20* | (2006.01) | |
| *H04W 84/12* | (2009.01) | |
| *H04W 72/08* | (2009.01) | |
| *H04W 72/04* | (2009.01) | |

(56) References Cited

U.S. PATENT DOCUMENTS

| | | | |
|---|---|---|---|
| 2001/0031647 A1* | 10/2001 | Scherzer et al. | 455/562 |
| 2003/0064753 A1* | 4/2003 | Kasapi et al. | 455/561 |
| 2004/0121753 A1* | 6/2004 | Sugar et al. | 455/333 |
| 2004/0174299 A1* | 9/2004 | Casas et al. | 342/373 |
| 2005/0002327 A1* | 1/2005 | Li | 370/210 |
| 2005/0047322 A1* | 3/2005 | Sondur | 370/203 |
| 2005/0130606 A1* | 6/2005 | Wang et al. | 455/101 |
| 2006/0035674 A1* | 2/2006 | Karaoguz et al. | 455/562.1 |
| 2006/0079289 A1* | 4/2006 | Lewis | 455/562.1 |
| 2006/0165008 A1* | 7/2006 | Li et al. | 370/252 |

\* cited by examiner 802.11b/g Coverage 802.11abg Listen Mode

WIRELESS ACCESS POINT ARRAY

PRIORITY CLAIM AND CROSS REFERENCE TO RELATED APPLICATIONS

This application is a continuation application, that claims the benefit of the priority of U.S. patent application Ser. No. 13/297,006, titled "ACCESS POINT IN A WIRELESS LAN ARRAY," by Steve Smith, Dirk I. Gates, Ian Laity, Michael R. Conley, Michael de la Garrigue, and Kurt Sauter, filed on Nov. 15, 2011, which is currently co-pending on the filing date of this application. This application also claims the benefit of the priority of U.S. patent application Ser. No. 11/816,003, titled "ACCESS POINT IN A WIRELESS LAN ARRAY," by Steve Smith, Dirk I. Gates, Ian Laity, Michael R. Conley, Michael de la Garrigue, and Kurt Sauter, filed on Sep. 22, 2008, which has issued as U.S. Pat. No. 8,160,036, U.S. patent application Ser. No. 11/816,003 is the parent application of U.S. patent application Ser. No. 13/297,006.

This application further claims priority of the following provisional patent applications:

1. Prov. App. Ser. No 60/660,171, titled "Wireless LAN Array," by Dirk I Gates, Ian Laity, Mick Conley, Mike de la Garrigue, and Steve Smith, filed on Mar. 9, 2005;
2, Prov. App. Ser. No. 60/660,276, titled "Wireless LAN Array," by Dirk L Gates, Ian Laity, Mick Conley, Mike de la Garrigue, and Steve Smith, filed on Mar. 9, 2005;
3. Prov. App. Ser. No. 60/660,375, titled "Wireless Access Point," by Dirk I. Gates and Ian Laity, filed on Mar. 9, 2005;
4. Prov. App. Ser. No. 60/660,275, titled "Multi-Sector Access Point Array," by Dirk I. Gates Ian Laity, Mick Conley, Mike de la Garrigue, and Steve Smith, filed on Mar. 9, 2005;
5. Prov. App. Ser. No. 60/660,210, titled "Media Access Controller For Use In A Multi-Sector Access Point Array," by Mike de la Garrigue and Drew Bertagna filed on Mar. 9, 2005;
6. Prov. App. Ser. No. 60/660,174, titled "Queue Management Controller For Use In A Multi-Sector Access Point Array," by Mike de la Garrigue and Drew Bertagna filed on Mar. 9, 2005;
7. Prov. App. Ser. No. 60/660,394, titled "Wireless LAN Array," by Dirk I. Gates, Ian Laity, Mick Conley, Mike de la Garrigue, and Steve Smith, filed on Mar. 9, 2005;
8. Prov. App. Ser. No. 60/660,209, titled "Wireless LAN Array Architecture," by Dirk I. Gates, Ian Laity, Mick Conley, Mike de la Garrigue, and Steve Smith, filed on Mar. 9, 2005;
9. Prov. App. Ser. No. 60/660,393, titled "Antenna Architecture of a Wireless LAN Array," by Abraham Hartenstein, filed on Mar. 9, 2005;
10. Prov. App. Ser. No. 60/660,20, titled "Load Balancing In A Multi-Radio Wireless Lan Array Based On Aggregate Mean Levels," by Mick Conley filed on Mar. 9, 2005;
11. Prov. App. Ser. No. 60/660,392, titled "Advanced Adjacent Channel Sector Management For 802.11 Traffic," by Mick Conley filed on Mar. 9, 2005;
12. Prov. App. Ser. No. 60/660,391, titled "Load Balancing In A Multi-Radio Wireless Lan Array Based On Aggregate Mean Levels," by Shaun Clem filed on Mar. 9, 2005;
13. Prov. App. Ser. No. 60/660,277, titled "System for Transmitting and Receiving Frames in a Multi-Radio Wireless LAN Array," by Dirk I. Gates and Mike de la Garrigue, filed on Mar. 9, 2005;
14. Prov. App. Ser. No. 60/660,302, titled "System for Allocating Channels in a Multi-Radio Wireless LAN Array," by Dirk I. Gates and Kirk Mathews, filed on Mar. 9, 2005;
15. Prov. App. Ser. No. 60/660,376, titled "System for Allocating Channels in a Multi-Radio Wireless LAN Array," by Dirk I. Gates and Kirk Mathews, filed on Mar. 9, 2005; and
16. Prov. App. Ser. No. 60/660,541, titled "Media Access Controller For Use In A Multi-Sector Access Point Array," b Dirk I. Gates and Mike de la Garrigue, filed on Mar. 9, 2005.

This application further claims priority to the following PCT patent applications:

1. PCT patent application no. PCT/US2006/008747, titled "Antenna Architecture of a Wireless LAN Array,"
2. PCT patent application no. PCT/US2006/008743, titled "Wireless LAN Array," filed on Mar. 9, 2006, which claims priority to the above provisional patent applications;
3. PCT patent application no. PCT/US2006/008696, titled "Assembly and Mounting for Multi-Sector Access Point Array," tiled on Mar. 9, 2006;
4. PCT patent application no PCT/US2006/08698, titled "System for Allocating Channels in a Multi-Radio Wireless LAN Array," filed Mar. 9, 2006; and
5. PCT patent application no. PCT/US2006/008744, titled "Media Access Controller for use in a Multi-Sector Access Point Array," filed on Mar. 9, 2006, All of the above-listed US patent applications, US provisional patent applications, and PCT applications are incorporated by reference herein.

BACKGROUND OF THE INVENTION

1. Field of the Invention

The invention relates to wireless data communication systems and more particularly to systems and methods for providing access points in wireless local area networks.

2. Description of the Related Art

The use of wireless communication devices for data networking is growing at a rapid pace. Data networks that use "WiFi" ("Wireless Fidelity") are relatively easy to install, convenient to use, and supported by the IEEE 802.11 standard. WiFi data networks also provide performance that makes WiFi a suitable alternative to a wired data network for many business and home users.

WiFi networks operate by employing wireless access points to provide users having wireless (or 'client') devices in proximity to the access point with access to data networks. The wireless access points contain a radio that operates according to one of three standards specified in different section of the IEEE 802.11 specification. Radios in access points communicate using omni-directional antennas in order to communicate signals with wireless devices from any direction. The access points are then connected (by hardwired connections) to a data network system that completes the users' access to the Internet.

The three standards that define the radio configurations are:

1. IEEE 802.11a, which operates on the 5 GHz band with data rates of up to 54 Mbps;
2. IEEE 802.11b, which operates on the 2.4 GHz band with data rates of up to 11 Mbps; and
3. IEEE 802.11g, which operates on the 2.4 GHz band with data rates of up to 54 Mbps.

The 802.11b and 802.11g standards provide for sonic degree of interoperability. Devices that conform to 802.11b may communicate with 802.11g access points. This interoperability comes at a cost as access points will incur additional protocol overhead if any 802.11b devices are connected. Devices that conform to 802.11a may not communicate with either 802.11b or g access points. In addition, while the 802.11a standard provides for higher overall performance, 802.11a access points have a more limited range due to their operation in a higher frequency hand.

Each standard defines 'channels' that wireless devices, or clients, use when communicating with an access point. The 802.11b and 802.11g standards each allow for 14 channels. In IEEE Std. 802.11a-1999, 200 channels are defined; each channel centered every 5 MHz from 5000 MHz to 6000 MHz. The 802.11a standard currently allows for 12 channels in the US. The 14 channels provided by 802.11b and g include only 3 channels that are not overlapping. The 12 channels provided by 802.11a are non-overlapping channels. The FCC is expected to allocate 11 additional channels in the 5.47 to 5.725 GHz band.

Access points provide service to a limited number of users. Access points are assigned a channel on which to communicate. Bath channel allows a recommended maximum of 64 clients to communicate with the access point. In addition, access points must be spaced apart strategically to reduce the chance of interference, either between access points tuned to the same channel, or to overlapping channels. In addition, channels are shared. Only one user may occupy the channel at any given time. As users are added to a channel, each user must wait longer for access to the channel thereby degrading throughput.

As more and more users utilize access points for service, there is a need to increase the number of clients served by each access point and to maintain throughput even as the number of clients is increased.

SUMMARY

System consistent with the present invention provide wireless access devices for providing a plurality of client devices with wireless access to at least one data network. In one example, the wireless access devices employ a plurality of transceivers, each transceiver having a directional antenna. Each directional antenna is positioned to transmit and receive signals in a sector. Each sector defines a portion of a coverage area surrounding the wireless access device. The wireless access device has an array controller connected to the plurality of transceivers to control operation of the plurality of transceivers. The wireless access device also has a network interface to a data network and a media access controller to control communication of data between the transceivers and the network interface.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

Figure 1:
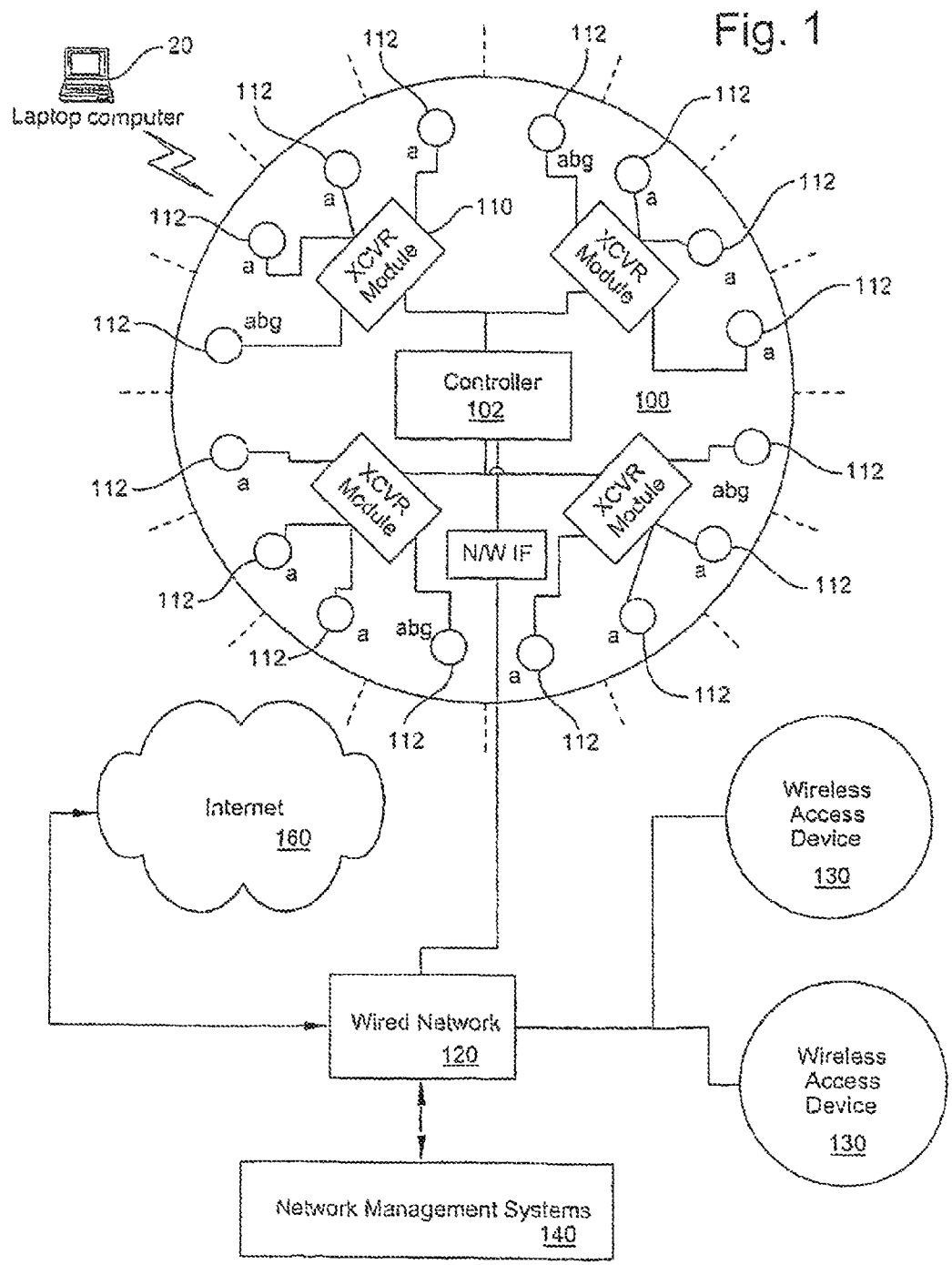
FIG. 1 is a block diagram of a network that uses a wireless access device.

FIG. 1 is a block diagram of network 10 that uses a wireless access device 100 to provide client devices (or "stations"), such as a laptop computer 20, access to data network services available on the Internet 160. The wireless access device 100 is connected to a wired network 120, winch may provide a connection to the Internet 160 or other network. Depending on the number of stations and the size of the area of coverage, the network 10 may include additional wireless access devices 130. A network management system 120 may be used to configure and manage the wireless access devices 100, 130. The network management system 120 may receive performance data from the first and second wireless access devices 100, 130 in order to perform network management functions.

The wireless access device 100 in FIG. 1 has a substantially circular structure 108 and includes a array controller 102, a plurality of transceiver modules 110, and a network interface 114. The transceiver modules 110 contain one or more transceivers, radios, for example, and each transceiver is connected to an antenna 112. The transeciver modules 110 are also connected to the array controller 102, which operates to configure the transceiver modules 110 and manage any communications connections involving the transceivers.

The wireless access device 100 shown in FIG. 1 has sixteen antennas 112. One of ordinary skill in the art will appreciate that any number of antennas may be used. The antennas 112 that correspond to the transceivers in the transceiver modules 110 are disposed near the perimeter of the substantially circular structure 108 of the wireless access device 100. The antennas 112 are preferably directional antennas configured to transmit and receive signals communicated in a radial direction from the center of the wireless access device 108. Each antenna 112 covers a portion of the substantially circular area surrounding the wireless access device 100 called a "sector" $S_i$. The total area covered by all of the sectors defines a 360° area of coverage of the wireless access device 100. This means that a station 20 located in a sector of the area of coverage would be able to communicate wirelessly with the antenna 112 corresponding with that sector. Multi-sector coverage is discussed in more detail below with reference to FIGS. 5A-5E.

The network 10 in FIG. 1 implements well-known, standards and protocols used to communicate over the Internet 160. The transceivers in the wireless access device 100 in FIG. 1 communicate with stations 20 in accordance with the IEEE 802.11 standard (802.11a, 802.11b, 802.11g), which is incorporated herein by reference. The remainder of this specification describes operation of examples of the wireless access device 100 in the context of systems that implement IEEE 802.11a, b, or g. However, the present invention is not limited to systems that implement any particular standard. The wireless access device 100 may operate according to any current or future standard, such as for example, the forthcoming IEEE 802.11n.

The wireless access device 100 in FIG. 1 has four transceiver modules 110. Each transceiver module 110 contains four transceivers, each of which is programmable. In a preferred configuration, three of the four transceivers (shown in FIG. 1 with antennas labeled 'a') each transceiver module 110 are designated to operate as 802.11a radios. The remaining transceiver (shown in FIG. 1 with antenna labeled 'abg') may be programmed to operate according to any of 802.11a, b, or g. Each transceiver is configured to operate on an assigned channel. The channel may be one of the twelve channels available using the 802.11a standard or one of the fourteen channels available using the 802.11b/g standard.

The wireless access device 100 communicates with stations 20 wirelessly. The stations 20 may be any device enabled to communicate wirelessly with the wireless access device 100 such as, without limitation, laptop computers, mobile telephones (for voice-over-LAN, or VOWLAN applications), personal digital assistants, handheld computers, etc. In examples described here, the stations are enabled to operate in accordance with one or more of the 802.11 standards. When the station 20 enters the coverage area of the wireless access device 100, it may send a request to connect to the access point 160. The wireless access device 100 may perform an authentication process in a login session. Once authenticated, the user of the station 20 may be connected to the Internet 160.

Figure 2:
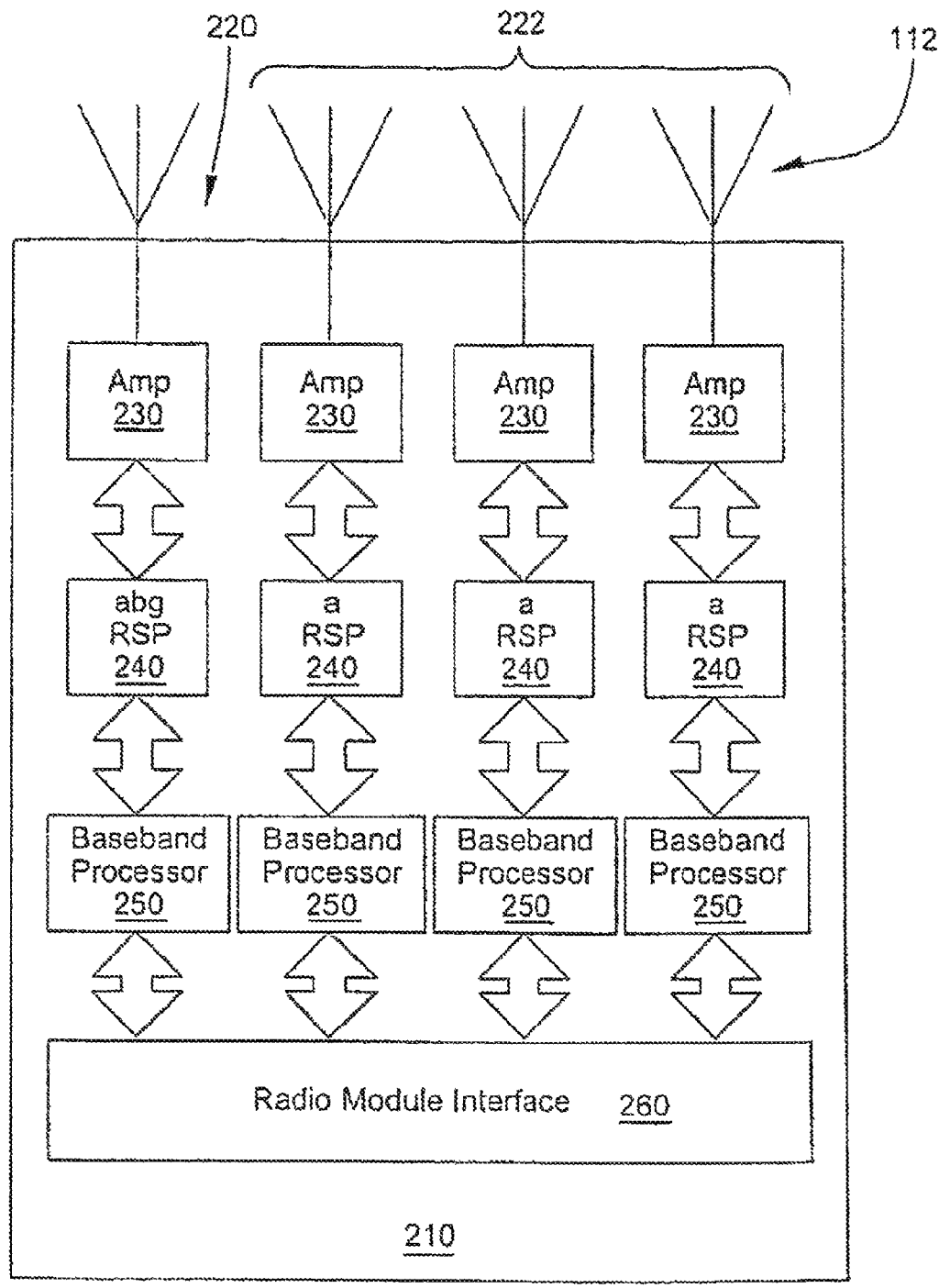
FIG. 2 is a block diagram of a transceiver module in the wireless access device in FIG. 1.

FIG. 2 is a block, diagram of a transceiver module 210 that may be implemented in the wireless access device 100 shown in FIG. 1. The transceiver module 210 includes four radios, one of which is an 'abg' radio 220 and three of which are 'a' radios 222. All four radios 220, 222 include an amplifier 230, a radio signal processor 240, and baseband processor 250. The four radios 220, 222 communicate with a transceiver module interface 260, which allows the transceiver module 210 to communicate with the rest of the wireless access device. One of ordinary skill in the art will appreciate that four radios 220, 222 are shown as an example. The transceiver module 210 may also have one, two, or any number of radios.

Each radio 220, 222 connects to an antenna 212, which transmits and receives radio signals received from the amplifier 230. As described with reference to FIG. 1, the antennas 212 are directional antennas, which concentrate signal power in one direction. Directional antennas can therefore cover greater distances than omni-directional antennas used in typical wireless access devices. The multiple radios with radially disposed directional antennas advantageously provides a 360° coverage pattern that is larger than that of radios with omni-directional antennas used in current access points.

The baseband processor 250 processes the digital data that is either being received or transmitted by the radio 220, 222. The baseband processor 250 implements protocols required for such functions as assembling/disassembling payloads. The base band processor 250 performs the digital functions required to implement the 802.11 standard. Preferably, the baseband processor 250 is programmable and may be configured for any of the three standards (802.11a, 802.11b, 802.11g). One example of a baseband processor 250 that may be implemented is the Agere WL64040.

The radio signal processor 240 modulates signals to be transmitted and demodulates signals that have been received. The radio signal processor 240 is preferably programmable to implement either the modulation schemes specified by 802.11b/g or 802.11a. One example of a radio signal processor 240 that may be implemented is the Agere WL54040.

The amplifier 230 generates the radio signal to be transmitted by the transceiver 220, 222 and amplifies signals being received by the antenna 212. One example of an amplifier that may be implemented in the transceiver module 210 is the SiGe Semi-conductor SE2535L for the 5 GHz or 802.11a radios, and the SiGe Semiconductor SE2525L for the 2.4 GHz or 802.11b/g radios.

In the transceiver module in FIG. 2, the amplifier 230, radio signal processor 240, and/or baseband processor 250 may be programmable so that the array controller 102 (in FIG. 1) may control the transceiver module 200 in a manner that provides certain features. For example, the array controller 102 (in FIG. 1) may control the amplifiers 230 in a manner that makes the coverage pattern of the wireless access device 102 larger or smaller depending on the needs of the implementation. In addition, the baseband processor 250 may communicate information (such as signal strength) about the radio connection between the wireless access device 100 and the stations 20.

It is noted that the following description refers to transceivers as radios. Those of ordinary skill in the art will appreciate that the teal "radio" is not intended as limiting the transceiver to any particular type.

Figure 3:
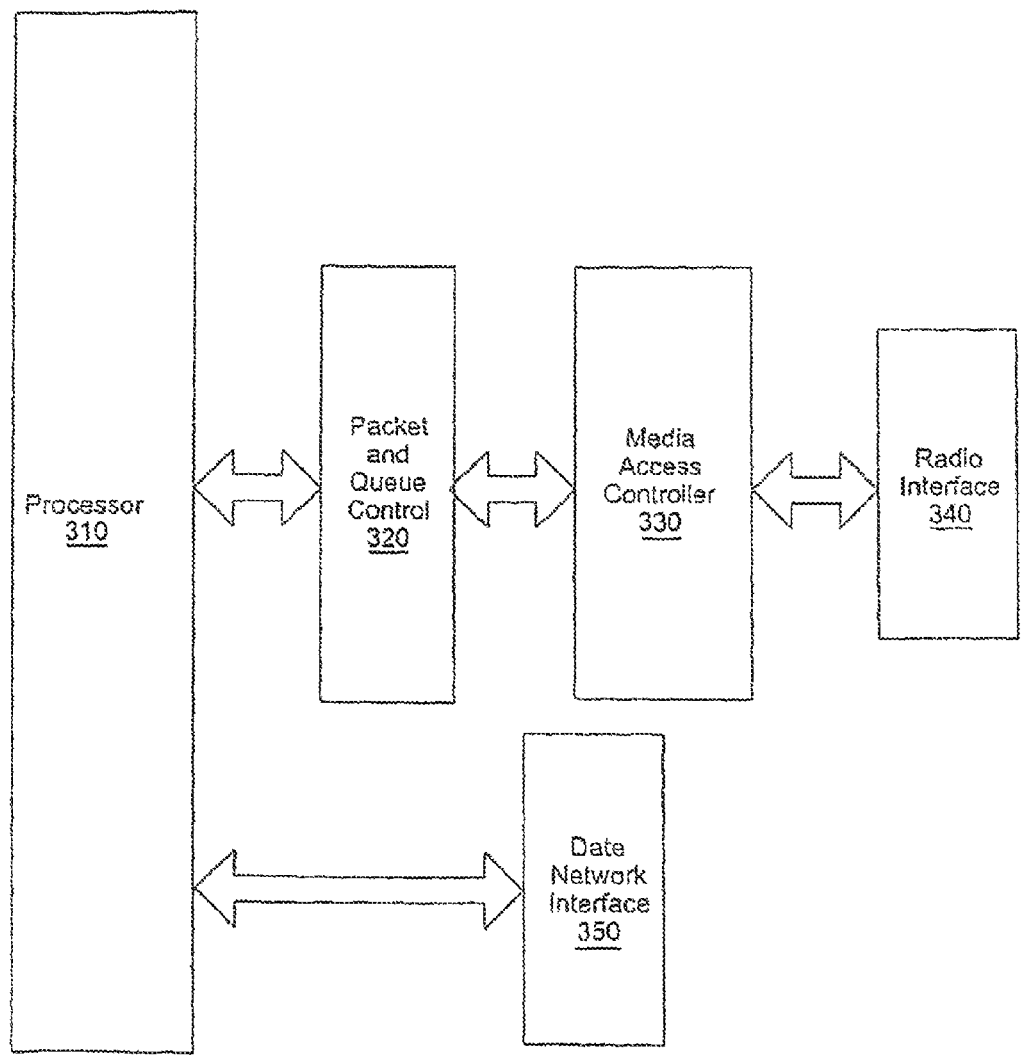
FIG. 3 is a block diagram of a controller in the wireless access device shown in FIG. 1.

FIG. 3 is a block diagram of an array controller 300 that may be implemented in the wireless access device 100 shown in FIG. 1. The array controller 300 includes a processor 310, a packet and queue controller 320, a medium access controller 330, a radio interface 340, and a data network interface 350.

The processor 310 provides computing resources to the wireless access device. The processor 310 may be any suitable custom or commercial microprocessor, microcontroller, computing chip or other type of processor. The array controller 300 also includes supporting circuitry for the processor 310 such as clock circuitry, I/O ports, memory (including Read Only Memory, or ROM, Random Access Memory, or RAM, Flash memory, Programmable Rom or PROM, etc.), direct memory access, etc. The processor 310 may also manage a bus system for communicating with its support circuitry and with the packet and queue controller 320, data network interface 350 and medium access controller 330. In one example, the processor 310 is a Motorola 8540 800 MHz CPU supported by 64 MB expandable system FLASH memory, 128 MB DDR 333 expandable system RAM, and a serial interface (RS232-RJ45 connector). An optional security co-processor may also be included.

The data network interface 350 includes input/output circuitry for communicating over a data network. The array controller 300 implements standards and protocols that allow for communication over the Internet. The data network interface 350 preferably allows for the highest possible speed connection. In one example, the data network interface 350 includes primary and secondary Gigabit Ethernet interfaces, a Fast Ethernet interface, and failover support between the Gigabit Ethernet interfaces.

The packet and queue controller 320 handles receiver and transmitter queues, performs DMA functions, resolves fragmentation, and performs packet translation. The medium access controller 330 provides all IEEE 802.11 MAC services for transceivers. For the wireless access device 100 in FIG. 1, the medium access controller 330 provides 802.11 MAC services for as many as sixteen transceivers. Both the packet and queue controller 320 and the medium access controller 330 are preferably implemented as application specific integrated circuits (ASIC).

The array controller 300 performs the programmed functions that control the wireless access device 100 as an access point. Functions and features of the operations that the array controller 300 performs include:

1. General implementation IEEE 802.11 Access Point functionality.
2. Non-blocking packet processing from/to any radio interface. In typical wireless access devices that employ a single, omni-directional radio, a packet that is being transmitted may block other packets from access to the medium. This may occur in either direction. Stations typically transmit packets to an access point when the medium is not busy. If the medium is busy with packets from other stations, for example, the packet is blocked. Similarly, the access point may be attempting to send a packet to a station. If other packets are being sent to another station, the original packet is blocked from access to the medium. In the wireless access device 100, when a station is blocked front communicating a packet to one radio, it may switch to another radio that is not blocked. If the wireless access device 100 is blocked from sending a packet via one radio, it may switch to another radio.
3. Dynamic automatic channel assignment. The array controller 300 implements algorithms and/or other schemes for assigning channels of the 802.11 standards to the multiple radios. Channels are allocated to radios in a manner that reduces adjacent channel interference (ACI).
4. Directional awareness of where a wireless station is in geographic relationship to the wireless access device 100. The array controller 300 receives information such as signal strength, and for each station, may keep track of how the signal strength changes over time. In addition, even if one radio is locked in and "connected" to a station, another radio may receive signals and turns, "listen" to the station. The signal strength in relation to the specific radios gathering signal information provide the array controller with sufficient information to create a directional awareness of the location of the wireless station.
5. Station mobility services whereby a station can instantly roam from one sector to another without requiring re-authentication of the station. As a wireless station moves in the coverage area space of the wireless access device, the signal strength sensed by the array controller changes. As the signal strength of the station be comes weaker, the radio associated with the adjacent sector locks in and "connects" with the station without requiring re-authentication.
6. Wireless quality of service.
7. Enhanced load balancing of wireless stations.
8. Constant RF monitoring of channel conditions and security threats
9. Wireless Security processing
10. Internal Authentication Server. Typically, authentication takes place at a server or router that is wired to the access points. In the wireless access device 100, authentication may be done by the array controller 300.
11. Wired Networking protocol support.
12. System failover handling and error handling. Because sectors overlap, when a radio fails, the adjacent radios may lock in with stations being handled by the failed radio. In some examples of the wireless access device 100, the array controller 300 may increase power to adjacent sectors to ensure coverage in any area covered by the failed sector. In addition, when multiple access devices are deployed, one wireless access device may increase power and expand a sector to cover area left without service when a radio fails in an adjacent wireless access device. Whether a single multiple access device or multiple access devices are deployed, the channel assignment of the radios in either of wireless access devices may be modified to optimize performance.
13. System management functions. The network management system 140 (in FIG. 1) may be used for example to provide centralized management and administration of systems in which more than one wireless access device is deployed. The network management system 140 may perform network management functions, such as for example, initiating a dynamic channel assignment in which channel assignments for radios in either wireless access device is modified in view of performance or the failure of one or more radios in one of the wireless access devices. The channel assignment may be carried out to minimize channel interference.

As discussed above, examples of wireless access devices and systems that employ wireless access devices described in this specification (without limitation) operate in the wireless LAN environment established by the IEEE 802.11 standardization body. The IEEE 802.11 standards including (without limitation):

1. IEEE 802.11, 1999 Edition (ISO/IEC 8802-11: 1999) IEEE Standards for Information Technology—Telecommunications and Information Exchange between Systems—Local and Metropolitan Area Network—Specific Requirements—Part 11: Wireless LAN Medium Access Control (MAC) and Physical Layer (PHY) Specifications.
2. IEEE 802.11a-1999 (8802-11:1999/Amd 1:2000(E)), IEEE Standard for Information technology—Telecommunications and information exchange between systems—Local and metropolitan area networks—Specific requirements—Part 11: Wireless LAN Medium Access Control (MAC) and Physical Layer (PHY) specifications—Amendment 1: High-speed Physical Layer in the 5 GHz band.
3. IEEE 802.11b-1999 Supplement to 802.11-1999, Wireless IAN MAC and PRY specifications: Higher speed Physical Layer (PHY) extension in the 2.4 GHz band.
4. 802.11b-1999/Cor1-2001 IEEE Standard for information technology—Telecommunications and information exchange between systems—Local and metropolitan area networks—Specific requirements—Part 11: Wireless LAN Medium Access Control (MAC) and Physical Layer (PHY) specifications—Amendment 2: Higher-speed Physical Layer (PHY) extension in the 2.4 GHz band—Corrigendum1.
5. IEEE 802.11d-2001, Amendment to IEEE 802.11-1999, (ISO/IEC 8802-11) Information technology—Telecommunications and information exchange between systems—Local and metropolitan area networks—Specific requirements—Part 11: Wireless LAN Medium Access Control (MAC) and Physical Layer (PHY) Specifications: Specification for Operation in Additional Regulatory Domains.

6. IEEE 802.11F-2003 IEEE Recommended Practice for Multi-Vendor Access Point interoperability via an Inter-Access Point Protocol Across Distribution Systems Supporting IEEE 802.11 Operation.
7. IEEE 802.11g-2003 IEEE Standard for Information technology—Telecommunications and information exchange between systems—Local and metropolitan area networks—Specific requirements—Part 11: Wireless LAN Medium Access Control (MAC) and Physical Layer (PHY) specifications—Amendment 4: Further Higher-Speed Physical Layer Extension in the 2.4 GHz Band.
8. IEEE 802.11b-2003 IEEE Standard for Information technology—Telecommunications and Information Exchange Between Systems—LAN/MAN Specific Requirements—Part 11: Wireless LAN Medium Access Control (MAC) and Physical Layer (PHY) Specifications: Spectrum and Transmit Power Management Extensions in the 5 GHz band in Europe.
9. IEEE 802.11i-2004 Amendment to IEEE Std 802.11, 1999 Edition (Reaff 2003). IEEE Standard for Information technology—Telecommunications and information exchange between system—Local and metropolitan area networks Specific requirements—Part 11: Wireless LAN Medium Access Control (MAC) and Physical Layer (PHY) specifications—Amendment 6: Medium Access Control (MAC) Security Enhancements.
10. IEEE 802.11j-2094 IEEE Standard for Information technology—Telecommunications and information exchange between systems—Local and metropolitan area networks—Specific requirements—Part 11: Wireless LAN Medium Access Control (MAC) and Physical Layer (PHY) specifications—Amendment 7: 4.9 GHz—5 GHz Operation in Japan.

All of the above-listed standards are incorporated herein by reference.

Radios operating under 802.11 may operate in one of two frequency bands: the 2.4 GHz band and the 5 GHz hand. The IEEE specifies multiple channels within each band (see Table 1). Channels are defined as allocations of frequency spectrum with specified center frequencies and spacing. For example, in the 2.4 GHz band there are 14 defined channels starting at a center frequency of 2.412 GHz and incrementing up to 2.484 GHz at 5 MHz intervals. Channels are considered overlapping if their bands overlap above a certain power threshold. For instance, in the 2.4 GHz region each channel operates with a frequency band of 12 MHz on either side of the center frequency. So with 14 channels defined with center frequencies 5 MHz apart, several of them are overlapping. In fact, there are only three channels (channels 1, 6, and 11) that do not overlap in the 2.4 GHz band. Their center frequencies are 2.412 GHz, 2.437 GHz and 2.462 GHz).

In the 5 GHz band, the IEEE Std. 802.11a-1999 defines 200 channels; each channel centered every 5 MHz from 5000 MHz to 6000 MHz. The 802.11a standard currently allows for 12 channels in the US. The 12 channels provided, by 802.11a are non-overlapping channels. The FCC is expected to allocate 11 additional channels in the 5.47 to 5.725 GHz band. Those of ordinary skill in the art will appreciate that the channels described herein are for purposes of illustrating an example and not intended as any limitation on the scope of the invention. Embodiments of the present invention that are designed to implement any part of the 802.11 standard may use any set of channels specified by any part of the IEEE 802.11 standard whether Such channels are as now or in the future.

TABLE 1

IEEE 802.11 U.S. Radio Channel Assignments

| IEEE 802.11 A (5.0 GHz Band) | | IEEE 802.11 B/G (2.4 GHz Band) | |
|---|---|---|---|
| Channel Number | Frequency (MHz) | Channel Number | Frequency (MHz) |
| 36 | 5180 | 1 | 2412 |
| 40 | 5200 | 2 | 2417 |
| 44 | 5220 | 3 | 2422 |
| 48 | 5240 | 4 | 2427 |
| 52 | 5260 | 5 | 2432 |
| 56 | 5280 | 6 | 2437 |
| 60 | 5300 | 7 | 2442 |
| 64 | 5320 | 8 | 2447 |
| 149 | 5745 | 9 | 2452 |
| 153 | 5765 | 10 | 2457 |
| 157 | 5785 | 11 | 2462 |
| 161 | 5805 | 12 | 2467 |
| | | 13 | 2472 |
| | | 14 | 2484 |

The wireless access device 100 in FIG. 1 assigns channels to the sixteen radios in a manner that enhances performance, throughput, coverage area and capacity. Typical access points use one radio with a coverage area defined by an omni-directional antenna and assigned to a single channel. Therefore, all of the users in the coverage area tune in to the same channel in order to communicate with the access point. In the wireless access device 100 in FIG. 1, each radio forms a different sector defining a portion of a substantially circularly-defined coverage pattern. In addition, each radio is assigned a unique channel so that no two radios in one device communicate over the same channel.

Figure 4:
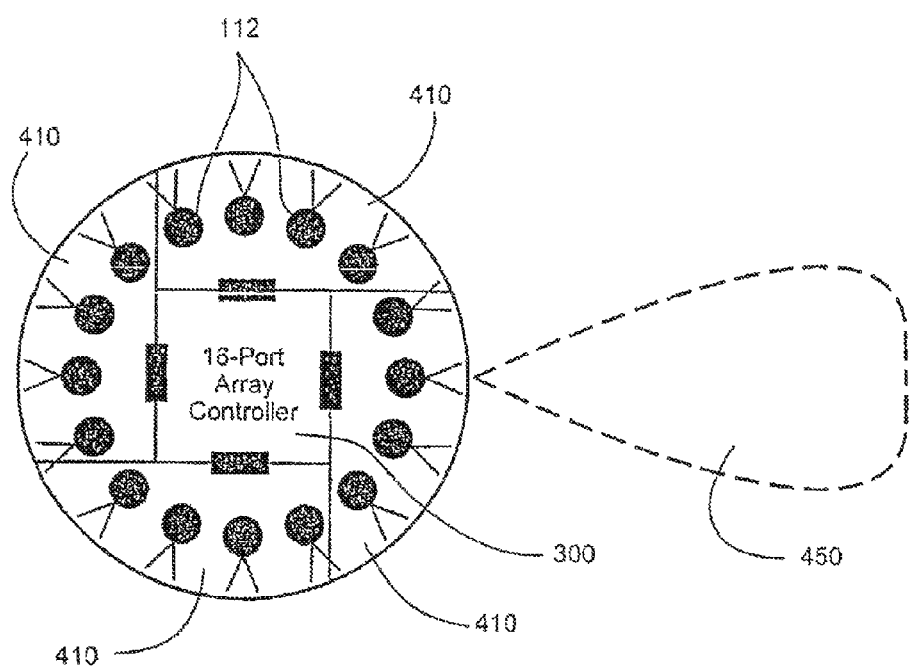
FIG. 4 is a diagram illustrating the formation of sectors by the wireless access device of FIG. 1.

FIG. 4 is a diagram illustrating the formation of sectors by the wireless access device of FIG. 1. The wireless access device 100 has 16 radios 412 divided into groups of four radios 412 mounted on each of four transceiver modules 410. An array controller 402 is located roughly in the center of the wireless access device 100 where it connects with each of the four transceiver modules 410 at inter-module connections 408. The inter-module connections 408 contain communication paths (via a bus or set of signal paths on a connector) that implement the interface between the array controller 402 and the radios 412. One of ordinary skill in the art will appreciate that the wireless access device 100 may have more or fewer than 16 radios. For example, in other embodiments, the wireless access device 100 has 4 radios (e.g. three 'abg' uni-directional radios and one 'abg' omni-directional) or 8 radios (e.g. four 'a' unidirectional radios, three 'abg' unidirectional radios, one 'abg' omni-directional radio) or even 24 radios (anywhere from 16-24 'a' radios and 0-8 'abg' radios). The number of radios is not important so long as multiple radios may be configured to provide a 360° coverage area.

As discussed, each radio 412 contains a directional antenna configured to establish a coverage area in a sector 450 that radiates out from the wireless access device 100. The radios 412 may be individually controlled such that when they are all operating they may form a coverage pattern that surrounds the wireless access device 100. The coverage pattern created by the wireless access device 100 may be similar to coverage patterns created by existing access points that use one radio radiating out of an omni-directional antenna. However, the wireless access device 100 in FIG. 4 uses sixteen radios 412 radiating out of more powerful directional antennas to create a coverage pattern area that is significantly greater than that of a typical access point. In addition, the sectors 450 created by the radios 412 in the wireless access device 100 advantageously overlap to provide features not currently available in typical access points. The radios 412 are also programmable such that they may be controlled to operate at power levels that allow for coverage patterns that are suited to the layout of the implementation. Examples are discussed below with reference to FIGS. 5A-E.

Figure 5A:
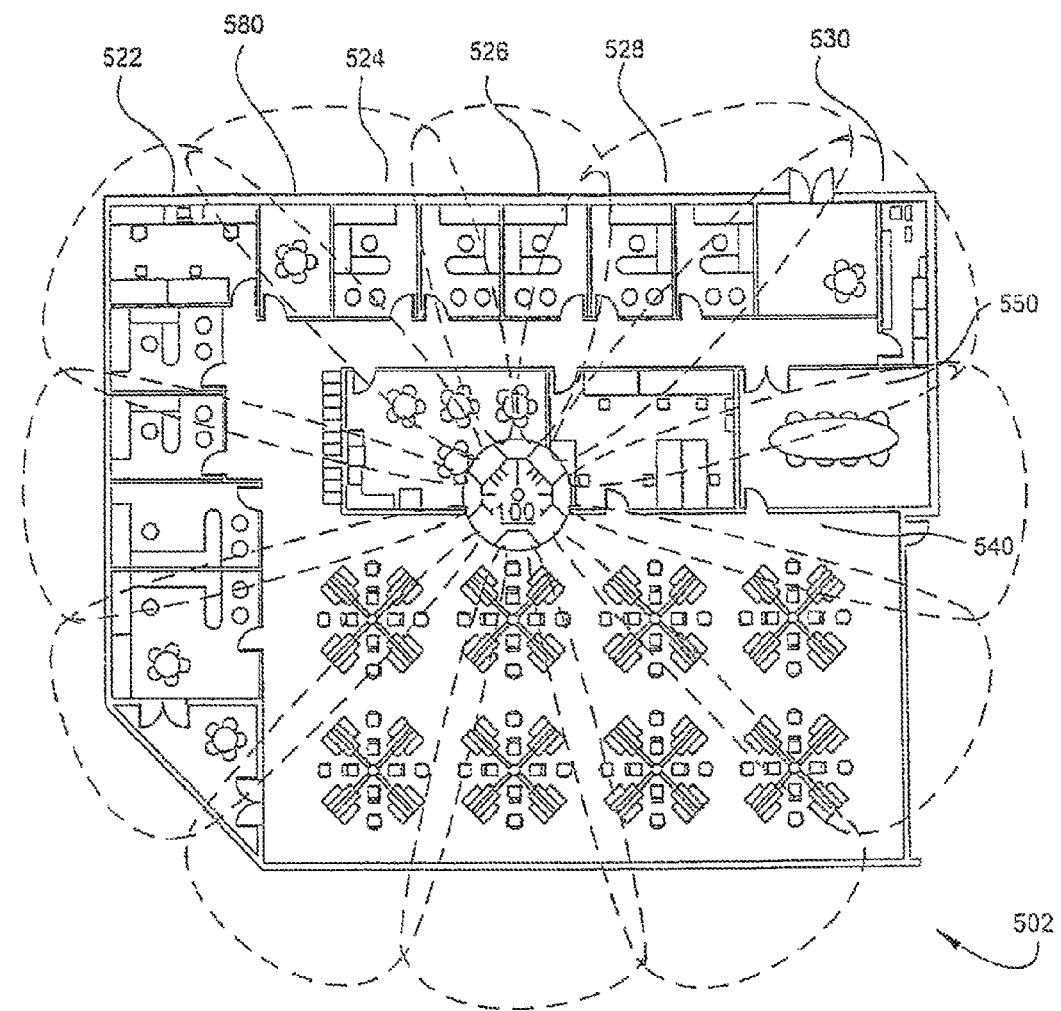
FIGS. 5A-E are diagrams illustrating examples of coverage patterns formed by an example of the wireless access device of FIG. 1.

In FIG. 5A, a wireless access device 100 is implemented in an implementation I with all of the radios in the wireless access device 100 configured to communicate with stations within a coverage area 502. The radios in the wireless access device 100 form sectors. A first sector 530 is shown with an adjacent sector 540 along with an area of overlap 550 formed by the overlap of the first and second sectors 530, 540. FIG. 5A illustrates one of many advantages that the wireless access device 100 has over typical access points. The wireless access device 100 includes programmable and configurable control over the operation of the radios on the wireless access device 100. When deployed, the wireless access devices 100 may be configured to create a coverage pattern that is suitable for by the exact implementation I. For example, in FIG. 5A, the coverage pattern 502 has been configured to conform to the implementation I. The wireless access device 100 may be configured such that the radios that create a set of coverage patterns 522, 524, 526, 528, 530 that project towards a side 580 communicate signals at a lower power limiting the extent of the coverage area created by each radio. This is illustrated by a set of middle sectors 524, 526, 528 covering less distance than outer sectors 522, 530, which cover the corners or the implementation I along the side 580. This implementation I advantageously substantially limits the ability for a station to connect from beyond the wall along the side 580 of implementation I.

Figure 5B:
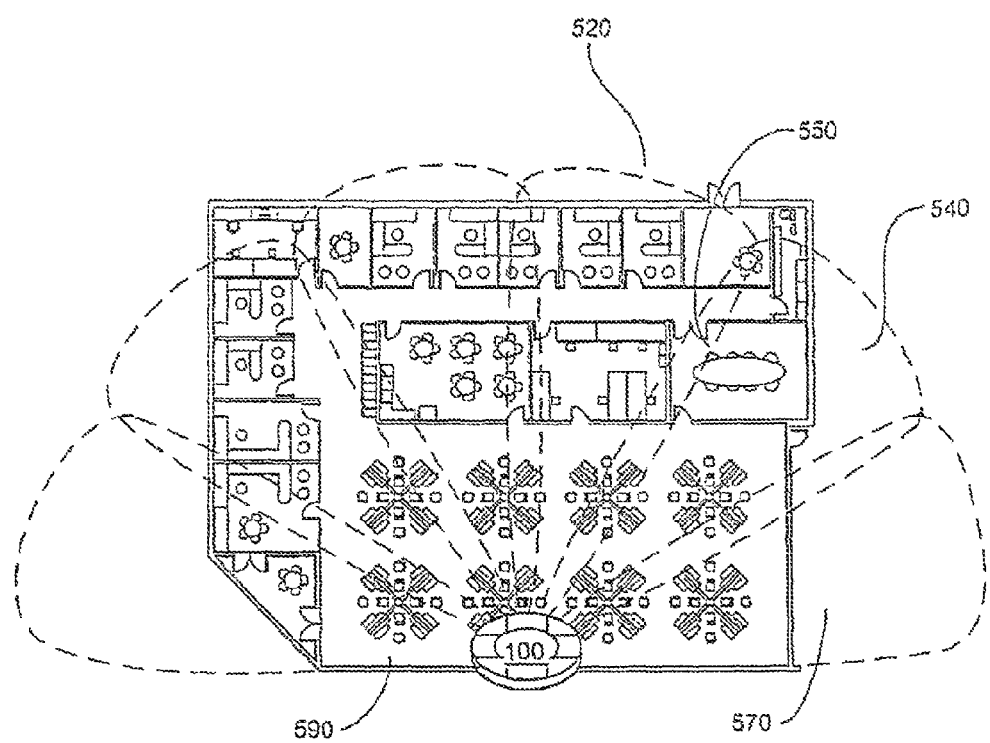

FIG. 5B illustrates how the wireless access device 100 may be configured to provide special features in a specific implementation. In FIG. 5B, the wireless access device 100 is implemented in a space 570 in which the resident desires to have wireless Internet access. The space 570 is located with one side 590, which faces an open and public area from which hackers or otherwise unauthorized users may attempt to gain access to the Internet via the wireless access device 100. The wireless access device 100 may be used to provide users in the space 570 with access to the Internet while limiting access by those on the other side of 590. One way as illustrated in FIG. 5B is to place the wireless access device 100 along the side 590 and turn off radios that would create sectors on the other side of 590, and turn on the radios that create sectors in the space 570. Such an implementation would yield a coverage pattern similar to the one shown in FIG. 5B.

Figure 5C:
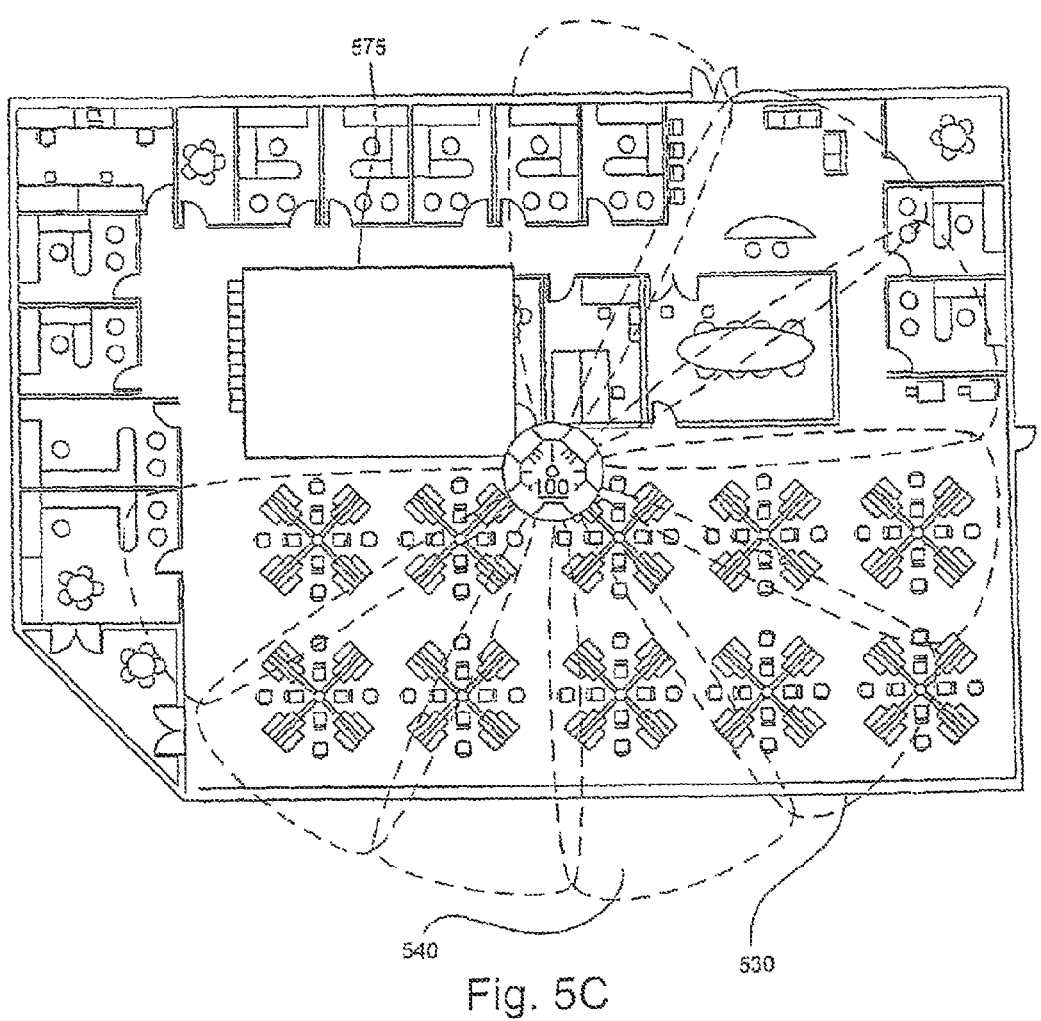

FIG. 5C shows how the wireless access device 100 may be configured to limit the affects of obstacles that may cause reflections in the radio signals. Reflections in typical access points may cause multi-path interference. When radio signals reflect off of obstacles, the reflections may reach the station as different signals coming from different directions, or multiple paths. The wireless access device 100 may be configured to avoid multi-path interference by configuring the radios to avoid generating sectors that could reach the obstacle. In FIG. 5C, the wireless access device 100 is shown generating sectors 520, 540, but not generating any sectors in the direction of obstacle 575.

Figure 5D:
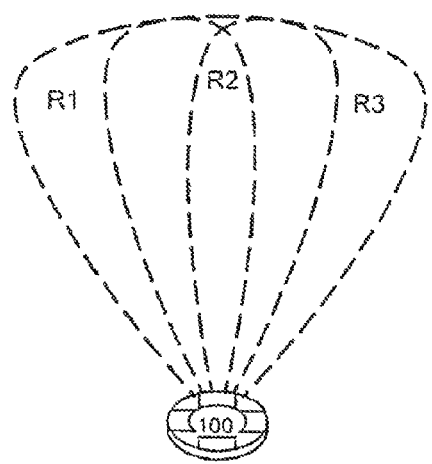
Figure 5E:
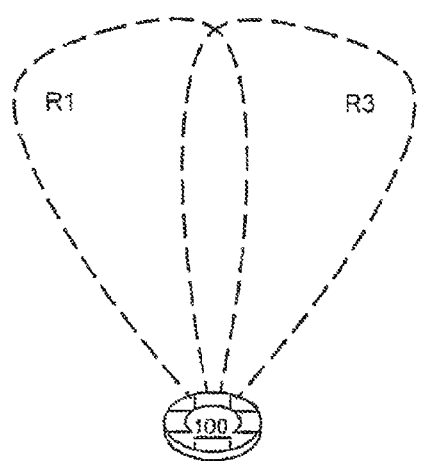

FIG. 5D illustrates how overlapping sectors may be used to provide radio frequency failover so that stations do not lose connectivity when a radio fails, or is otherwise unavailable. In FIG. 5D, wireless access device 100 has three radios creating a sector each (R1, R2, R3). In FIG. 5E, the wireless access device 100 has lost the radio associated with sector R2. However, sectors R1, R2, R3 advantageously overlap. The wireless access device 100 may switch stations in sector R2 that were connected via the radio that generated sector R2 to the radios that created either of sectors R1 or R3.

Figure 6B:
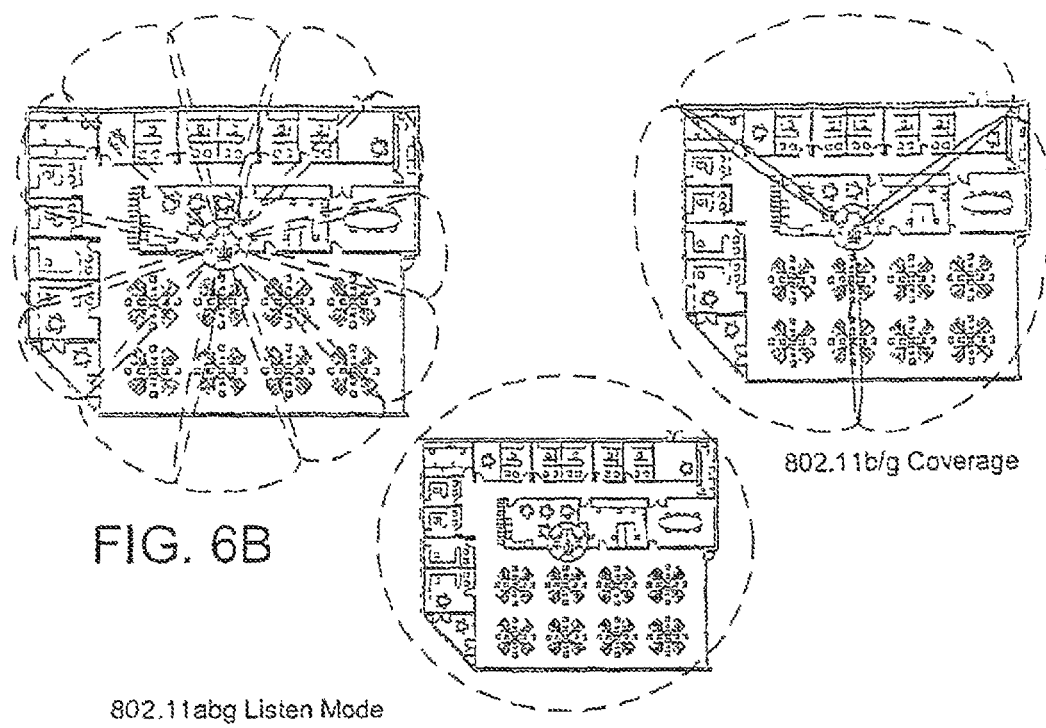
FIG. 6B shows coverage patterns formed by the different radio types on the wireless access device.
Figure 6A:
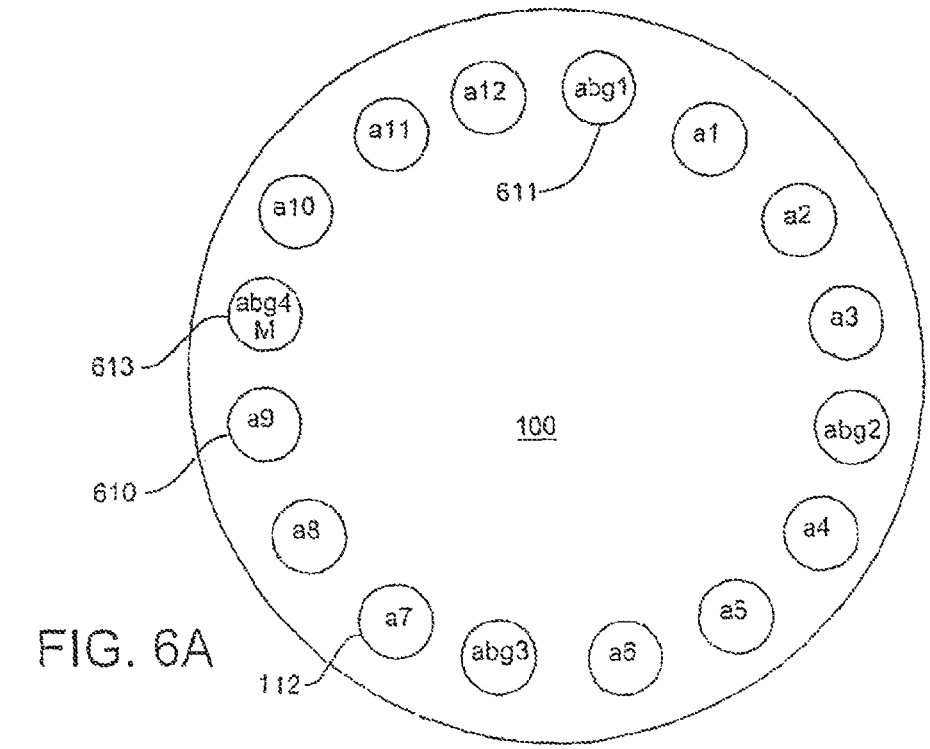
FIG. 6A is a diagram of a wireless access device of FIG. 1 labeled by radio type and number.

FIG. 6A is a diagram of a wireless access device 100 of FIG. 1 labeled by radio type and number. Radios that communicate, or are configured to communicate, as 802.11a radios only are labeled 'a'. Radios that may be programmed or configured to communicate using 802.11a, b, or g radios are labeled 'abg.' The twelve 'a' radios 610 (a1-a12) are assigned a unique one of the twenty-three channels available under the 802.11a standard. Three of the four 'abg' radios are assigned the three non-overlapping channels available under the 802.11b/g, standards. The fourth 'abg' radio is implemented as an omni-directional radio in listen mode exclusively.

FIG. 6B shows coverage patterns formed by the different radio types on the wireless access device. The twelve 'a' radios 610 each have a coverage area emanating in a sector that spreads out more than 30°. The sectors of the twelve 'a' radios 610 may combine to form a substantially circular 802.11a coverage pattern 620. Preferably, the sectors are larger than 30° in order to create overlap between the sectors, such as for example, the overlap 650 between sectors 630 and 640. FIG. 6B also shows the three 'abg' radios 611 with the coverage area of more than 120°. The sectors combine to provide a 360° coverage pattern. However, each sector is more than 120° to create overlap between the sectors. The fourth 'abg' radio 613 is configured as an omni-directional radio able to communicate in all directions. The fourth 'abg' radio 613 is used as a monitor or a sniffer radio in a listen-only mode. This radio listens to each channel in sequence to build a table of all stations and access devices. This table maybe compared to an administrator controlled list of allowed stations and access devices. Stations and access devices not in the administrator controlled list are termed rogues. One function performed by the fourth 'abg' radio 613 is to detect unauthorized stations in the coverage area.

Figure 7:
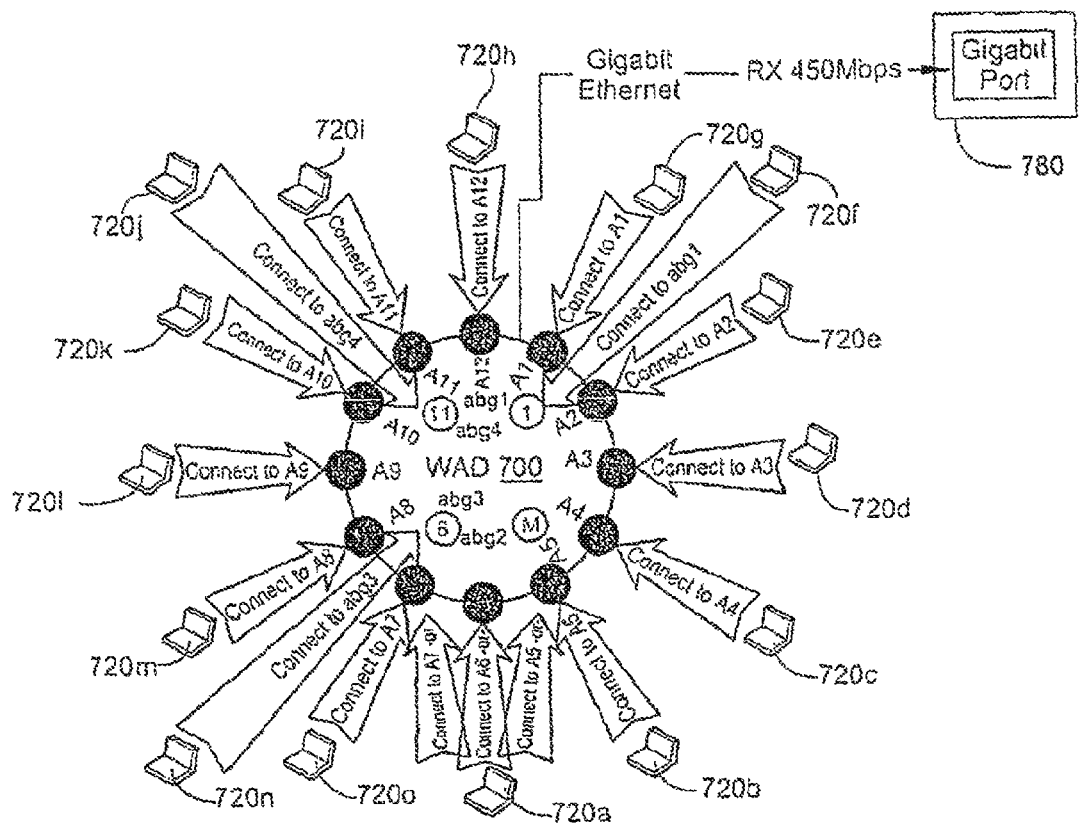
FIG. 7 illustrates operation of a wireless access device.

FIG. 7 is a diagram of a wireless access device 700 connected wirelessly to a plurality of stations 720a-o is channels allocated to the plurality of radios a1-a12, afg1-afg4 on the wireless access device 700. The radios are labeled according to their type and radio numbers. Inside the circles representing the radios are numbers identifying the channels assigned to the radio. As shown, radios a1-a12 and afg1-afg4 are assigned channels as shown in Table 2 below:

TABLE 2

| Radio No. | Channel | Frequency (MHz) |
|---|---|---|
| A9 | 36 | 5180 |
| A12 | 40 | 5200 |
| A3 | 44 | 5220 |
| A6 | 48 | 5240 |
| A10 | 52 | 5260 |
| A1 | 56 | 5280 |
| A4 | 60 | 5300 |
| A7 | 64 | 5320 |
| A11 | 149 | 5745 |
| A2 | 153 | 5765 |

TABLE 2-continued

| Radio No. | Channel | Frequency (MHz) |
|---|---|---|
| A5 | 157 | 5785 |
| A8 | 161 | 5805 |
| M | — | Monitor radio that can listen on any abg channel |
| abg1 | 1 | 2412 |
| abg3 | 6 | 2437 |
| abg4 | 11 | 2462 |

The radios in the wireless access device 700 are advantageously assigned different channels. The radios in FIG. 7 and the array controller (described above with reference to FIG. 3) are housed within a single enclosure tightly coupled by digital bus. The housing provides a central control point for the sixteen radios that is not tethered by any cabled bus.

The stations 720a-o in FIG. 7 represents stations attempting to connect to the wireless access device 700. The arrows indicate the stations' ability to connect to a particular radio as well as the ability of the station to communicate using the appropriate protocol (i.e. 802.11a, b, or g). To illustrate, station 720a is a target wireless client attaching to the wireless access device 700 using protocols specified by 802.11a. Radios a5, a6, and a7 generate sectors that preferably overlap such that station 720a may connect to either one of the three radios. Each radio is assigned a unique channel that does not overlap with any other channel.

If the radio to which station 720a is connected fails, or is otherwise unable to provide service to station 720a, the array controller is able to switch the connection to station 720a over to one of the adjacent radios. The IEEE 802.11a, b, and g protocols permit radios to "listen" to signals being communicated with stations that are connected to another radio. The array controller may obtain data such as signal strength and directional awareness and other factors that allow it to determine which radio is best suited to continue communicating with the station 720a. The array controller may use data obtained from "listening" radios to determine performance, throughput, or other performance factors. The array controller 300 may compile the data for all of the radios and use the data to determine whether a different radio should be used, and if necessary to reassign or modify the channel assignment of the radio. The array controller 300 may also perform a modification of the channel assignments of other radios in order to minimize ACI. The array controller 300 may change the channel assignments if a radio fails, or if the array controller 300 determines that better performance may be achieved by modifying the channel assignments, for example to enhance load balancing.

The wireless access device 700 is connected to a Gigabit Ethernet port 780, which provides a direct connection to the user's network.

Although the controller 300 depicted in FIG. 3 uses memory, one skilled in the art will appreciate that a substantial part of systems and methods consistent with the present invention may be stored on or read from other machine-readable media, for example, secondary storage devices such as hard disks, floppy disks, and CD-ROMs; a signal received from a network; or other forms of ROM or RAM either currently known or later developed. Further, although specific components of wireless access device 100 are described, one skilled in the art will appreciate that a network access device suitable for use with methods, systems, and articles of manufacture consistent with the present invention may contain additional or different components.

The foregoing description of an implementation has been presented for purposes of illustration and description. It is not exhaustive and does not limit the claimed inventions to the precise form disclosed. Modifications and variations are possible in light of the above description or may be acquired from practicing the invention. For example, the described implementation includes software but the invention may be implemented as a combination of hardware and software or in hardware alone. Note also that the implementation may vary between systems. The claims and their equivalents define the scope of the invention.

What is claimed is:

1. A system for providing access to data network services comprising:
   at least one wireless access device comprising:
      a plurality of transceivers, each transceiver having a directional antenna, each directional antenna positioned in a substantially circular array to communicate signals with a plurality of stations in a corresponding sector of a plurality of sectors, each corresponding sector generated using the directional antenna and each sector defining a portion of a coverage area surrounding the wireless access device;
      an array controller in signal communication with each of the plurality of transceivers, the array controller configured to:
         assign a predetermined channel to each of the plurality of transceivers on which the transceiver communicates with stations in the corresponding sector, where the predetermined channel is unique relative to the predetermined channels assigned to the other transceivers;
         modify the predetermined channel assignment to each of the plurality of transceivers to dynamically optimize performance; and
         control communication of data between the stations and the transceivers, and between the transceivers and the network interface; and
   a wired network connected to the at least one wireless access device, the wired network having an interface to at least one data network service; where the at least one wireless access device communicates with stations within the coverage area and forms a communications path between the wireless stations and the wired network.

2. A system according to claim 1 where each of the plurality of transceivers in the at least one wireless access device is a radio configured to communicate pursuant to the IEEE 802.11a, IEEE 802.11b, or IEEE 802.11g standard.

3. A system according to claim 2 where the plurality of transceivers in the at least one wireless access device covers all available channels in the band defined by IEEE 802.11a, IEEE 802.11b, or IEEE 802.11g.

4. A system according to claim 1 where the array controller in each of the at least one wireless access devices is configured to dynamically modify the predetermined channel assignment pursuant to the standards defined in IEEE 802.11h.

5. A system according to claim 2 where the transceivers in the at least one wireless access device include a first plurality of transceivers configured to operate pursuant to IEEE 802.11a and a second plurality of transceivers configured to operate pursuant to IEEE 802.11b/g.

6. A system according to claim 5 where each of the first plurality of transceivers is assigned a unique channel defined by 802.11a.

7. A system according to claim 5 where each of the second plurality of transceivers is assigned a unique non-overlapping channel defined by 802.11b/g.

8. A system according to claim 2 where one of the plurality of transceivers is configured to receive only using an omni-directional antenna.

9. A system according to claim 1 where the array controller in each of the at least one wireless access device is configured to monitor performance of the plurality of transceivers by:
   detecting a failure of any one of the plurality of transceivers; and
   identifying another one of the plurality of transceivers best capable of replacing the failed one of the plurality of transceivers.

10. A system according to claim 1 where the array controller in each of the at least one wireless access device is configured to monitor performance of the plurality of transceivers by:
   configuring at least one of the plurality of transceivers to listen to signals communicated between any one of the other transceivers and at least one station;
   obtaining data from the at least one of the plurality of transceivers configured to listen; and
   determining performance and/or throughput for the plurality of transceivers from the obtained data.

11. A system according to claim 1 further comprising a network management system operable to provide management functions over the at least one wireless access device.

12. A system according to claim 11 where the network management system is configured to receive performance data from a first one of the at least one wireless access device and a second wireless access device, where the network management functions include the function of initiating a modification of channel assignment of the transceivers on either the first or the second wireless access device.

13. A wireless service access area comprising:
   a plurality of coverage sectors, each coverage sector defining a space within which a client station may associate with a corresponding one of a plurality of radios mounted in a wireless access device; and
   an array controller in signal connection with the plurality of radios, the array controller configured to:
   assign a predetermined channel to each of the plurality of radios on which the radio communicates with stations in the corresponding sector, where the predetermined channel is unique relative to the predetermined channels assigned to the other radios;
   modify the predetermined channel assignment to each of the plurality of radios to dynamically optimize performance; and
   control communication of data between the stations and the radios, and between the radios and the network interface;
   where the wireless access device includes an interface to a data network to provide access to data network services to stations that associate with the radios.

14. A wireless service access area according to claim 13 where each coverage sector overlaps with at least one adjacent coverage sector such that the client station may associate with at least one other one of the plurality of radios.

15. A wireless service access area according to claim 13 where the plurality of radios form a corresponding plurality of coverage sectors that form a 360° coverage area.

16. A wireless service access area according to claim 13 where the plurality of radios are controlled to turn on or off in accordance with a desired coverage pattern.

17. A wireless service access area according to claim 16 where the desired coverage pattern is a 180° coverage pattern.

18. A wireless service access area according to claim 16 where the desired coverage pattern avoids an obstacle that would generate reflected radio signals.

19. A wireless service access area according to claim 13 where the plurality of radios are each controlled to communicate at a designated power level in accordance with a desired coverage pattern.

20. A wireless service access area according to claim 13 where the plurality of radios communicates according to any part of IEEE 802.11.

21. A wireless service access area according to claim 13 where a first plurality of radios communicates according to IEEE 802.11a and a second plurality of radios communicates according to IEEE 802.11b or g.

* * * * *